US006514357B1

(12) United States Patent
Tada et al.

(10) Patent No.: US 6,514,357 B1
(45) Date of Patent: Feb. 4, 2003

(54) COMPOSITION FOR METAL SURFACE TREATMENT AND SURFACE TREATED METALLIC MATERIAL

(75) Inventors: Chiyoko Tada, Chiba (JP); Hiroyuki Ogata, Chiba (JP); Shigeru Umino, Chiba (JP)

(73) Assignees: Kawasaki Steel Corporation, Kobe (JP); Dai Nippon Toryo Co., Ltd., Osaka (JP)

( * ) Notice: Subject to any disclaimer, the term of this patent is extended or adjusted under 35 U.S.C. 154(b) by 0 days.

(21) Appl. No.: 09/868,711

(22) PCT Filed: Oct. 5, 2000

(86) PCT No.: PCT/JP00/06904

§ 371 (c)(1), (2), (4) Date: Jun. 21, 2001

(87) PCT Pub. No.: WO01/31083

PCT Pub. Date: May 3, 2001

(30) Foreign Application Priority Data

Oct. 22, 1999 (JP) .......................................... 11-301529
Nov. 15, 1999 (JP) .......................................... 11-323796

(51) Int. Cl.[7] ................................................ C23C 22/00

(52) U.S. Cl. ...................... 148/251; 148/259; 148/262; 106/14.12; 106/14.21; 428/472.3

(58) Field of Search ................................ 148/251, 259, 148/262; 106/14.12, 14.21; 428/472.3

(56) References Cited

FOREIGN PATENT DOCUMENTS

| JP | 09-241856 A | * | 9/1997 |
|---|---|---|---|
| JP | 11-050010 A | * | 2/1999 |

* cited by examiner

*Primary Examiner*—John Sheehan
*Assistant Examiner*—Andrew L. Oltmans
(74) *Attorney, Agent, or Firm*—Young & Thompson

(57) ABSTRACT

A composition for metal surface treatment which comprises an aluminum ion, a magnesium ion, a manganese ion, a water-soluble organic resin, an acid and water; and a surface treated metal material which has been treated with the composition. The resultant surface treated metal material is free from the danger of water contamination owing to chromium, since the composition is free of chromium, and also is excellent in both electrical conductivity and corrosion resistance. Accordingly, the metal material can be used in a wide variety of applications in place of a conventional chromate-treated steel sheet and the like.

7 Claims, No Drawings

COMPOSITION FOR METAL SURFACE TREATMENT AND SURFACE TREATED METALLIC MATERIAL

TECHNICAL FIELD

The present invention generally relates to metal-surface-treating agents and surface-treated metal materials treated using the same. More particularly, the present invention relates to a surface-treated metal material having a superior conductivity and corrosion resistance and to a metal-surface treating composition of a chromium-free surface-treating agent capable of making such a metal.

BACKGROUND ART

Conventionally, zinc-type plated steel sheets such as galvanized steel sheets and zinc-aluminum plated steel sheets have been widely used in the fields of home appliances, automotive vehicles, and construction. In order to improve the corrosion resistance of these steel sheets, chromate films and organic films on the chromate films may be provided on the plated surfaces thereof. When the organic films are provided, the chromate films serve to improve the adhesion to the organic films.

While the chromate films have superior corrosion resistance and adhesiveness to coatings, a special effluent treatment prescribed by the Clean Water Act is required during the chromate coating step, because the films contain hexavalent chromium, resulting in higher costs.

Accordingly, a chromium-free surface-treating technique has been desired in order to prevent generation of white rust on steel sheets, particularly in the zinc-type-plated steel sheets. There are a number of techniques suggested as exemplified below.

1. In Japanese Unexamined Patent Application Publication No. 5-195244, a metal-surface-treating method comprising a chromium-free composition, containing (a) an anion component comprising at least four fluorine atoms and at least one atom of titanium, zirconium, or the like (for example, titanium fluoride represented by ($TiF_6^{2-}$)), (b) a cation component such as cobalt or magnesium, (c) a free acid for pH adjustment, and (d) an organic resin, is proposed. However, according to the description, the surface-treated metal sheets obtained by this method exhibit corrosion resistance only when conventional protective compositions for undercoating and finish-coating are applied on the surfaces thereof. The resulting film alone does not provide a sufficient corrosion resistance.

2. In Japanese Unexamined Patent Application Publication No. 9-241856, a metal-surface-treating method comprising a chromium-free composition containing (a) a hydroxylic copolymer, (b) phosphorous, and (c) a phosphate of metal such as copper or cobalt is suggested. Although the surface-treated metal sheets obtained by this method exhibit a superior bare corrosion resistance in an as-worked state and a satisfactory adhesiveness to coatings, it is difficult to obtain conductivity due to a dense film formed by the crosslinks between various metal phosphates and the resin.

3. In Japanese Unexamined Patent Application Publication No. 11-50010, a metal-surface-treating agent comprising a chromium-free composition containing (a) a resin having a copolymer segment comprising a segment of polyhydroxyether and an unsaturated monomer, (b) phosphoric acid, and (c) a phosphate of metal such as calcium or cobalt is suggested. However, while the surface-treated metal sheets obtained by this method exhibit superior bare corrosion resistance, it is difficult to ensure conductivity due to a dense film formed by the crosslinks between various metallic phosphates and the resin.

4. In Japanese Unexamined Patent Application Publication No. 11-1069450, an aqueous surface-treating agent prepared by dissolving (a) ions of polyvalent metal such as manganese and cobalt, (b) an acid such as fluoro acid or phosphoric acid, (c) a silane coupling agent, and (d) an aqueous polymer having a polymerization unit of 2 to 50 in an aqueous solvent is proposed. However, in order to guarantee corrosion resistance, insoluble resin films formed by the etching effect of the acid composition contained in the treating agent are provided on the surfaces of the surface-treated metal sheets obtained by using this surface-treating agent. This film is mainly composed of a resin component, and it is therefore difficult to obtain conductivity.

5. In Japanese Unexamined Patent Application Publication No. 11-29724, a method for providing a coating on zinc-coated steel by using an aqueous rust-proof coating agent containing (a) a thiocarbonylic compound, (b) phosphate ions, (c) a water-dispersible silica is proposed. Sulfides such as thiocarbonyl compounds easily adhere to the surfaces of metal such as zinc; when sulfides are provided together with phosphate ions, thiol ions in the thiocarbonyl compound adhere to the active sites on the surface of zinc during coating, thereby exhibiting rust-resistance. However, while the resulting zinc-coated steel or non-coated steel exhibits satisfactory anti-corrosion properties when the surfaces thereof are coated with layers containing =N—C(=S)— groups or —O—C(=S)— groups, the steel exhibits no conductivity. Moreover, when the thickness of the coat is reduced so as to obtain conductivity, some portions are not coated by the thiocarbonyl compound, causing rust to develop. In short, anti-corrosion properties and conductivity are not compatible with each other even in this method.

6. In Japanese Unexamined Patent Application Publication No. 9-31665, a method for surface-treating magnetic steel sheets by using a chromium-free composition including (a) a copolymer containing hydroxyl groups and carboxyl groups, (b) phosphoric acid, (c) at least one of Mn, Al, Ba, Ca, and Sr heavy metal compounds, (d) a heavy metal containing at least one of $SiO_2$, $ZrO_2$, $SnO_2$, $Al_2O_3$, and $Sb_2O_5$ colloids, is suggested. While the resulting magnetic steel sheets exhibit satisfactory corrosion resistance, it is difficult to obtain conductivity due to a dense film formed of monomers containing hydroxyl groups and monomers containing carboxyl groups.

In the above-described methods 1 to 4, an acceptable corrosion resistance is achieved when the metal sheets are coated using sufficient amounts of the surface treating agent (coating agent), i.e., when the thickness of the coat is sufficient. However, when a partial coating is performed, leaving an exposed portion, for example, a projecting portion, on the metal sheet or when the thickness of the coat is significantly reduced, corrosion resistance thereof is drastically degraded. In other words, a sufficient corrosion resistance is exhibited only when the metal sheet is covered with the surface-treating agent at a ratio of 100%, but not when the ratio is less than 100%. Among these surface-treating agents, those in methods 2 to 4 obtain corrosion resistance due to the configuration of the resin coat yielded by the crosslinks between the metallic salt and resin. Therefore, an increase in the thickness over the entire coat results in the degradation of the conductivity. When the thickness of the coat is reduced so as to improve the conductivity, the corrosion resistance is degraded.

Moreover, the above-described conventional arts 1 to 6 aim to achieve a firm adhesion at the interface between the metal surface and the coat formed by the surface-treating agent. From a microscopic point of view, the metal surface and the surface-treating agent do not completely adhere to each other and there is a limit as to the possible improvements on the adhesive property. Accordingly, in these conventional techniques, the improvements on the density of the coat provided by the surface-treating agent has been the foremost important object over improvements on the adhesive property. This object is not compatible with the improvements of conductivity.

Recently, there is an increasing demand for chromium-free surface-treated metal sheets exhibiting corrosion resistance and low surface resistance to be used in office appliances such as copying machines and home appliances such as air conditioners. The steel sheets having low surface resistance, i.e., the steel sheets having a high conductivity, prevent leakage of noise generated by electromagnetic waves. However, among a number of conventional suggestions made regarding the chromium-free art, no art discloses zinc-type-plated steel sheets exhibiting a satisfactory conductivity at the same time with corrosion resistance, or a surface-treating composition for making the same.

In view of the above, an object of the present invention is to provide a surface-treated metal material, typically a surface-treated zinc-type plated steel sheet, having superior corrosion resistance and conductivity, which does not require special effluent treatments when the material is worked and during the step of coating using the surface-treating agent.

DISCLOSURE OF INVENTION

To achieve the above object, the present inventor has conducted an extensive research to complete the present invention.

The present invention relates to a metal-surface-treating composition comprising metal ions of Al, Mg, and Mn, a water-soluble organic resin, an acid, and water.

Preferably, in the composition, the water-soluble organic resin comprises at least one selected from the group consisting of polymers of carboxylic monomers, and copolymers of carboxylic monomers and other polymerizable monomers.

Preferably, in each of the above-described compositions, the acid is at least one selected from the group consisting of phosphoric acid, acetic acid, nitric acid, and hydrofluoric acid. More preferably, in this case, the above-described composition further contains an organic acid capable of being coordinated with polyvalent metals.

Preferably, the composition contains at least one selected from the group consisting of Zn, Co, Ti, Sn, Ni, Fe, Zr, Sr, Y, Nb, Cu, Ca, V, and Ba ions.

Preferably, the composition further contains polyphenol carboxylic acids.

Preferably, the composition further contains a water-dispersible resin.

Preferably, the composition further contains a coupling agent.

The present invention also provides a surface-treated metal material having a coat formed by applying one of the above-described metal-surface-treating compositions on a metal material. Preferably, the surface-treated metal material uses a zinc-type plated steel sheet as the metal material.

In this application, when a coat is formed by applying the surface-treating composition of the present invention on the surface of the metal material, the corrosion resistance is not degraded even when the thickness of the coat is significantly reduced, and a surface-treated metal material having superior conductivity can be obtained. Moreover, because the surface-treating composition of the present invention is chromium free, water pollution by chromium does not occur.

BEST MODE FOR CARRYING OUT THE INVENTION

A chromium-free metal-surface-treating composition and a metal material of the present invention will be described in detail below. The metal-surface-treating composition of the present invention is a mixture of metal ions of Al, Mg, and Mn, a water-soluble organic resin, an acid, and water. The composition is applied to, for example, a zinc-type plated steel sheet so as to form, on the plating layer, an organic resin layer which has conductivity and corrosion resistance and is dense and chemically stable.

As a result of mixing the water-soluble organic resin, specific types of metal ions, the acid, and water, the metal ions chemically react with the water-soluble organic resin and a metal material underlayer, and form the above-described organic resin layer. The resulting organic resin layer of the present invention exhibits conductivity and is dense, thereby contributing to the improvements on the corrosion resistance of the metal material even when the layer is thin. In this regard, the organic resin layer is different from the organic resin layer of a zinc-type plated steel sheet coated with a conventional organic resin. Because the conventional organic resin layer which coats the zinc-type plated steel sheet is not as dense as that of the present invention, the corrosion resistance thereof is drastically degraded when the layer thickness is reduced to obtain conductivity.

Preferably, the water-soluble organic resin mixed to the metal-surface-treating composition contains at least one selected from the group consisting of polymers of carboxylic monomers, and copolymers of carboxylic monomers and other polymerizable monomers. To be specific, at least one of the polymers, at least one of the copolymers, or a mixture of at least one of the polymers and at least one of the copolymers may be used.

Examples of the carboxylic monomers are ethylenically unsaturated carboxylic acids and derivatives thereof. Examples of ethylenically unsaturated carboxylic acids are monocarboxylic acids such as acrylic acid, methacrylic acid, and crotonic acid; and dicarboxylic acids such as itaconic acid, maleic acid, and fumaric acid. Examples of the derivatives are alkali metal salts, ammonium salts, and organic amine salts. The derivatives of acrilyc acid and methacrylic acid are preferable.

Examples of monomers which polymerize with carboxylic polymers are hydroxylic monomers, various types of acrylic esters, methacrylic esters, aromatic vinyl compounds, vinylester compounds, and other types of vinyl compounds. A vinyl compound containing a sulfonic acid group and a vinyl compound containing a phosphate group may also be used. Examples of preferable monomers are styrene and methacrylic esters such as butyl methacrylate and methyl methacrylate.

Moreover, carboxylic monomers which are polymerized or mixed with (co)polymers of (meth)acrylate esters, epoxy resin, ester-modified epoxy resin, or urethane-modified epoxy resin may be used.

Preferably, the metal-surface-treating composition of the present invention contains polyphenol carboxylic acids in order to further improve the corrosion resistance. As the polyphenol carboxylic acids, tannic acid and gallic acid are especially preferable when added at an amount of 0.1 to 20 percent by weight of the solid content of the metal-surface-treating composition.

Various types of resin additives may be mixed as long as they do not impair the object of the present invention.

When copolymers of carboxylic monomers and other polymerizable monomers are used, the content of the carboxylic monomers is preferably 40 percent by weight or more of the entire copolymer. When the content of the carboxylic monomers is 40 percent by weight or more, the density of the film is increased, improving the corrosion resistance.

The weight-averaged molecular weight of the copolymer is not limited but is preferably approximately 10,000 to several hundred thousand.

Three types of essential metal ions contained in the metal-surface-treating composition of the present invention are aluminum ion ($Al^{3+}$), magnesium ion ($Mg^{2+}$), and manganese ion ($Mn^{2+}$).

In this manner, pseudo-crosslinking reactions over a wide range of pH will occur during the formation of films, and the corrosion resistance drastically improves compared to the case where the three types of metal ions are not used. The resulting film is dense; accordingly, sufficient corrosion resistance and conductivity can be achieved at the same time even when the film is thin. This effect is further enhanced when used in combination with a carboxylic organic resin.

The metal ions are provided by dissolving metals, hydroxides, oxides, or salts such as phosphoric acid, nitric acid, carbonate, sulfuric acid, acetic acid, or hydrofluoric acid. Preferable ion sources are phosphoric acid, nitric acid, carbonate, sulfuric acid, acetic acid, and hydroxides of Al, Mg, and Mn.

Preferably, the metal-surface-treating composition of the present application contains at least one metal ion selected from the group consisting of Zn, Co, Ti, Sn, Ni, Fe, Zr, Sr, Y, Nb, Cu, Ca, V, and Ba in addition to the above-described three types of metal ions. In this case, these additional metal ions are preferably added to a solution of mineral salt of each metal, such as phosphate, nitrate, carboxylate, sulfate, or the like, or organic salt such as acetate or hydroxide. More preferably, an aqueous solution of zinc acetate or phosphate is used.

The solid content of each metal ion in the metal-surface-treating composition is preferably 0.1 to 5 percent by weight, and more preferably 0.1 to 2 percent by weight. When the content is 0.1 percent by weight or more, a sufficient corrosion resistance can be maintained. Weldability is improved when the content is 5 percent by weight or less. The total solid content of the three types of metal ions and the additional metal ions is preferably controlled to the range of 0.3 to 10 percent by weight of the metal-surface-treating composition.

In the present invention, the contribution of these metal ions to the corrosion resistance is not yet understood but can be assumed as follows. At the zinc-type-plating provided under the film layer, especially at defective portions of the film layer in a salt spray environment, zinc is eluted due to the reaction described in Formulae (1) and (2) below and conductive ZnO is generated due to the reaction described in Formulae (3) and (4), further promoting corrosion. When metal ions M are present in the corroded portions, a stable corrosion product comprising M and Zn is formed due to the reaction described in Formula (5) below, thereby improving the corrosion resistance.

$$\text{(anodic) } Zn \rightarrow Zn^{2+} + 2e^- \tag{1}$$

$$\text{(cathodic) } H_2O + 1/2O_2 + 2e^- \rightarrow 2OH^- \tag{2}$$

(formation of corrosion product)

$$Zn^{2+} + 2OH^- \rightarrow Zn(OH)_2 \tag{3}$$

$$Zn(OH)_2 \rightarrow ZnO + H_2O \tag{4}$$

$$M^{n+} + Zn^{2+} + XOH^- \rightarrow (M, Zn)(OH)_x \tag{5}$$

(M: Mg, Mn, Al, Zn, Co, Ti, Sn, Ni, Fe, Zr, Sr, Y, Cu, Ca, V, Ba, n: valence)

The acid contained in the metal-surface-treating composition of the present invention functions to maintain the composition in an acidic state. The pH of the composition is preferably adjusted to 1.0 to 3.0. The acid etches the surface of the metal material such as a zinc-type plated steel sheet, improves adhesion between the film formed by the metal-surface-treating composition and the zinc-based plating metal sheet, prevents the film from separating, and enhances the corrosion resistance.

Preferably, the acid comprises at least one selected from phosphoric acid, acetic acid, nitric acid, and hydrofluoric acid.

There is no limit imposed as to the solid content thereof in the metal-surface-treating composition. When applied to zinc-type-plated steel sheets, the content is preferably 1 to 20 percent by weight, and more preferably 5 to 15 percent by weight. When the content is 1 percent by weight or more, the pH thereof can be readily controlled within the above-described range. Thus, zinc plating can be efficiently etched, improving the corrosion resistance. In contrast, the content is preferably 20 percent by weight or less in order to prevent the plated surface from appearing uneven.

Preferably, the metal-surface-treating composition of the present invention contains a water-dispersible resin and a coupling agent because resistance against fingerprints and adhesiveness to the overcoat can be improved.

There is no limit imposed as to the types of the water-dispersible resin as long as the resin can be homogeneously and stably dispersed in the aqueous acids. Examples of the water-dispersible resins are acrylic styrenes, polyesters, acrylates, and carbamic acid esters, these resins being conventionally used for the metal-material surface treatment. These can be used in combination of two or more. A satisfactory effect can be obtained if the resin content is equal to the amount conventionally added to a surface-treating agent or coating material.

Preferably, the coupling agent has at least one reactive functional group selected from the group consisting of an active-hydrogen-containing amino group, an epoxy group, a vinyl group, a mercapto group, and a metacryloxy group. At least one selected from a silane coupling agent, a titanium coupling agent and a zirconium coupling agent is especially preferable.

A sufficient effect can be obtained if the content of the coupling agent is substantially equal to the amount conventionally added to a surface-treating agent (composition) or a coating material used for metal-material surface treatment.

Examples of the silane coupling agents are γ-aminopropyltriethoxysilane, γ-aminopropyltrimethoxysilane, N-β-aminoethyl-γ-aminopropyltrimethoxysilane, N-β-aminoethyl-γ-aminopropylmethyldimethoxysilane, N-γ-glycidoxypropyltrimethoxysilane, γ-glycidoxypropyltriethoxysilane, γ-glycidoxypropylmethyldimethoxysilane, β-3,4-epoxycyclohexylethyltrimethoxysilane, γ-mercaptopropyltrimethoxysilane, γ-methacryloxypropyltrimethoxysilane, γ-methacryloxypropylmethyldimethoxysilane, γ-methacryloxypropyltris(2-methoxyethoxy)silane, vinyltrimethoxysilane, vinyltriethoxysilane, vinyltris(2-methoxyethoxy)silane, vinyltriacetoxysilane, N-[2-(vinylbenzylamino)ethyl]-3-aminopropyltrimethoxysilane, and γ-methacryloxypropyltrimethoxysilane.

Examples of titanium coupling agents are diisopropoxybis(acetylacetonato)titanium, dihydroxybis (lactato)titanium, diisopropoxy-bis-(2,4-pentanedionato) titanium, and isopropyltri(dioctylphosphate)titanate.

Examples of zirconium coupling agents are acetylacetone zirconium butylate, zirconium lactate, and zirconium lactate.

Preferably, at least one organic acid capable of being coordinated with polyvalent metals is further added to the metal-surface-treating composition of the present invention since the corrosion resistance can be further enhanced. The organic acid promotes etching of the plated surface, is coordinated with metal ions, and makes the film more dense. Examples of acids are oxalacetic acid, tricarballylic acid, citric acid, isocitric acid, succinic acid, malic acid, and glutaric acid. The acid content is not limited, but is preferably in the range of 1 to 10 percent by weight of the solid content of the metal-surface-treating composition. When the content is 1 percent by weight or more, the number of crosslink points is increased, thereby improving the film density and fully realizing its advantage. The metal-surface-treating composition is kept stable if the content is 10 percent by weight or less.

In this invention, it is preferable to include a metal oxide in the metal-surface-treating composition in order to increase the density of the film formed from the composition. As the metal oxide, at least one selected from the group consisting of silica ($SiO_2$), MgO, $ZrO_2$, $Al_2O_3$, $SnO_2$, $Sb_2O_3$, $Fe_2O_3$, and $Fe_3O_4$, may be used. A sufficient effect can be obtained if the oxide is added at an amount substantially equal to an amount conventionally added to the surface-treating agent or coating material for metal-material surface-treatment.

The metal-surface-treating composition of the present invention is dissolved or dispersed in an aqueous solvent. The solution or dispersion is optimized to a solid content of 5 to 40 percent by weight, and preferably 10 to 30 percent by weight.

In the present invention, various other types of additives normally used for surface treatment, such as wax, may be mixed with the aqueous composition which is used as the surface-treating agent, in order to provide sliding characteristics, flaw resistance, and other kinds of features.

Moreover, the steel sheet of the present invention may be provided with still another film deposited on the upper coat of the film layer in order to provide extra features.

The metal-surface-treating composition of the present invention can be applied to any metal material but best exhibits effects when applied to zinc-type plated steel sheets.

For the purpose of this application, "zinc-type-plating" refers to a zinc-containing plating in general and includes zinc-containing alloy plating and zinc-containing composite dispersion plating. Examples of the zinc-based plating are pure Zn plating, binary Zn alloy plating such as Zn—Ni alloy plating, Zn—Fe alloy plating, Zn—Cr alloy plating, Zn—Co alloy plating, and Zn—Al alloy plating, ternary Zn alloy plating such as Zn—Ni—Cr alloy plating, Zn—Co—Cr alloy plating, zinc-based composite dispersion alloy plating such as Zn—$SiO_2$ plating and Zn—Co—Cr—$Al_2O_3$ plating. An electroplating method, a hot dipping method, or the like is suitably used to fabricate steel sheets provided with these zinc-based platings.

In order to fabricate surface-treated metal materials having organic resin layers using the metal-surface-treating composition of the present invention, the surface of each metal material is put into contact with a solvent or a dispersion of the composition, is pressed, and is dried to cure the resin so as to make a film. This is a widely known process. More specifically, the surface of a zinc-type-plated steel sheet as the metal material is provided with a solvent or a dispersion of the composition by means of roll coating, spray coating, brush coating, dip coating, or curtain flow coating, is pressed using a wringer roll, and is heated and dried to cure the resin so as to form a film, for example.

The thickness of the organic resin layer of the present invention is preferably in the range of 0.1 to 2.0 $\mu$m and more preferably in the range of 0.3 to 0.5 $\mu$m. A thickness of 0.1 $\mu$m or more is required for the organic resin layer to sufficiently cover the plating layer, thereby improving the corrosion resistance. The thickness is preferably 2.0 $\mu$m or less to keep the costs low.

Next, the reason why the film formed by applying the metal-surface-treating composition of the present invention exhibits superior conductivity and corrosion resistance is discussed. Generally, when a solution containing a carboxylic organic resin, an acid, and polyvalent metal ions is applied onto a metal material and is dried to form a film, pseudo-crosslinking of metal ions and molecules of carboxylic organic resin is known to occur. It is said that, because of the pseudo-crosslinking, the film composed of hydrophilic carboxylic-organic-resin develops a moisture resistance.

In view of the above, it is considered that because the metal-surface-treating composition of the present invention contains a sufficient amount of acid, an underlayer of the metal material, such as the plated surface of the zinc-type-plated steel sheet, is significantly etched, generating free plating-metal-ions in the vicinity of the plating interface, and, consequently, the ions of the metal material such as plating-metal-ions and the organic resin are pseudo-crosslinked as well. To put it differently, pseudo-crosslinking occurs not only between the molecules of organic resins but also between the plating surface and the organic resin layer, making it possible for the metal-surface-treating composition to exhibit both conductivity and corrosion resistance.

When three types of metal ions, i.e., Al, Mg, and Mn, or more coexist, three or more of metal ions having different coordination numbers relative to the carboxyl group coexist. In this manner, the pseudo-crosslinking reaction occurs in a wide range of pH, efficiently forming a film of an increased density.

EXAMPLES

The present invention will be described below by way of examples.

Examples 1 to 37, Comparative Examples 1 to 9

Metal-surface-treating compositions were prepared by mixing water-soluble resins A to L, metal ions (patterns A to O), acids A to D, water-dispersible resins A and B, coupling agents A to C, and organic acids A to C described below and an aqueous solvent, according to the ratios described in Tables 1-1 and 1-2. The water content in the composition is included in "balance" in Tables 1-1 and 1-2. The compositions were applied onto the surfaces of the metal material A to I described below by a roll coater, and were cured and dried by heating the metal materials to a temperature of 150° C. in 20 seconds in order to form test pieces of films having a predetermined thickness.

Metal Materials A to I

Sheet A: electrogalvanized steel sheet (sheet thickness: 1.0 mm, Zn: 20 g/m$^2$)

Sheet B: zinc-nickel electroplated steel sheet (sheet thickness: 1.0 mm, Zn—Ni: 20 g/m$^2$ Ni: 12 wt. %)

Sheet C: hot-dipped galvanized steel sheet (sheet thickness: 1.0 mm, Zn: 60 g/m$^2$)

Sheet D: galvannealed steel sheet (sheet thickness: 1.0 mm, Zn: 60 g/m$^2$, Fe: 10 wt. %)

Sheet E: zinc-aluminum steel sheet ("Galfan", sheet thickness: 1.0 mm, 60 g/m$^2$, Al: 5 wt. %)

Sheet F: zinc-aluminum steel sheet ("Galvalume", sheet thickness: 1.0 mm, 60 g/m$^2$, Al: 55 wt. %)

Sheet G: cold-rolled steel sheet (sheet thickness: 0.7 mm)

Sheet H: stainless steel sheet (SUS 304, sheet thickness: 1.0 mm)

Sheet I: aluminum alloy sheet (JIS A 5182, sheet thickness 1.0 mm)

Water-soluble Resins A to L

The figures in resins A to I, K, and L represent weight ratios based on monomer units in the polymers.

Resin A: AA/maleic acid=90/10 (molecular weight: 20,000)

Resin B: AA/itaconic acid=70/30 (molecular weight: 15,000)

Resin C: methacrylic acid/itaconic acid=60/40 (molecular weight: 25,000)

Resin D: butyl methacrylate/AA/2HBA=20/40/40 (molecular weight: 30,000)

Resin E: styrene/BMA/AA=30/30/40 (molecular weight: 30,000)

Resin F: Resin A/tannic acid=95/5

Resin G: Resin A/gallic acid=90/10

Resin H: hydroxybutyl acrylate 1/MMA/BA/styrene/methyl acrylate/organic phosphorous monomer=35/20/30/40/5/1

Resin I: a resin prepared by polymerizing the mixture of bisphenol A epoxy resin and unsaturated monomers (styrene/2HEA/methacrylate/acrylamide methylpropanesulfonic acid/dibutyl fumarate/azobisisobutyronitrile/α-methyl styrene dimer=10/6/8/2/4/2/2) (polystyrene-conversion average molecular weight: 10,000, hydroxyl group equivalent: 0.20/100 g, carboxyl group equivalent: 0.34/100 g, sulfonic group equivalent: 0.03/100 g)

Resin J: polymer of dimethylaminomethyl-hydroxystyrene

Resin K: polyethylene resin/thiourea=100/5

Resin L: 2HBA/MMA/BA/styrene/methacrylate/AA=40/15/40/40/40/10

In the above-described organic resin, AA represents acrylic acid, BMA represents butyl methacrylic acid, 2HEA represents 2-hydoxyethyl acrylate, BA represents butyl acrylate, 2HBA represents 2-hydroxybutyl acrylate, and MMA represents methyl methacrylate.

Metal Ions A to O

The figures in the patterns are based on the weight ratio of the metal ions.

Pattern A: Al/Mn/Mg=1/l/1

Pattern B: Al/Mn/Mg/Zn=1/1/1/1

Pattern C: Al/Mn/Mg/Ca=1/1/1/2

Pattern D: Al/Mn/Mg/Cu/Sr=2/1/1/2/1

Pattern E: Al=1

Pattern F: Al/Mn=2/1

Pattern G: Co/Zr=4/1

Pattern H: Co=1

Pattern I: Mn=1

Pattern J: Zn/Zr=1/10

Pattern K: Mn/Mg=5/1

Pattern L: Al/Mn/Mg/Zr/Co/Nb=1/1/1/1/1/1

Pattern M: Al/Mn/Mg/Sn/Y/V/Ba=1/2/1/2/1/1/1

Pattern N: Al/Mn/Mg/Fe/Ti=1/1/1/2/1

Pattern O: Al/Mn/Mg/Fe/Ni=1/2/2/1/1

Acids A to D

Acid A: phosphoric acid

Acid B: acetic acid

Acid C: nitric acid

Acid D: hydrofluoric acid

Water-dispersible resins A and B

Emulsion A: acrylic emulsion

Emulsion B: polyester emulsion

Silane Coupling Agents A to C

Silane A: γ-glycidoxypropyltrimethoxysilane ("KBM 403" available from Shin-Etsu Chemical Co., Ltd.) Silane B: "KBM 402" (available from Shin-Etsu Chemical Co., Ltd.)

Silane C: "KBM 603" (available from Shin-Etsu Chemical Co., Ltd.)

Organic acids A to C

Organic Acid A: tricarballylic acid

Organic Acid B: citric acid

Organic Acid C: succinic acid

Each of the test pieces was tested according to the testing methods described below in order to determine the characteristics below (corrosion resistance on a planar surface, adhesiveness to the upper coating, fingerprint resistance, and conductivity).

[Corrosion Resistance on a Planar Surface]

Each test piece was cut into 70 mm×150 mm, the end faces thereof being covered with a sealant, and was subjected to a salt water spray test (Japanese Industrial Standard Z-2371). The time required for white rust to develop over 5% of the surface of the test piece was measured and evaluated. The evaluation was performed according to the standards below and results are shown in Tables 1-1 and 1-2.

⊚: 120 hours or more

○: 96 hours or more and less than 120 hours

Δ: 72 hours or more and less than 96 hours x: less than 72 hours

[Coat Adhesiveness]

Based on JIS K-5400, a melamine-alkyd resin ("Organo Select 120 White", available from Nippon Paint Co., Ltd.) was applied with a coating thickness of 20 μm by a bar coating method, was baked at a temperature of 135° C. for 15 minutes to cure, and was then slit using a cutter knife so as to provide 100 cuts (10×10) of 1 mm×1 mm, each penetrating the film provided on each of the test pieces and reaching the base steel. An adhesive tape was attached thereon and was detached therefrom so as to visually examine the adherence of the coating after detachment. The evaluation was performed according to the standards below and results are shown in Tables 2-1 and 2-2.

⊚: proportion of the area with coating detached was 0%

○: proportion of the area with coating detached was more than 0% and less than or equal to 5%

Δ: proportion of the area with coating detached was more than 5% and less than or equal to 15% x : proportion of the area with coating detached was more than 15 % and less than or equal to 35% xx: proportion of the area with coating detached was more than 35%

[Fingerprint Resistance]

A change in color tone (L value, a value, and b value) of each of the test pieces before and after the application of a white vaseline was examined using a spectrophotometer ("SQ 2000" available from Nippon Denshoku Co., Ltd) and AE ($\Delta E=\sqrt{\Delta L^2+\Delta a^2+\Delta b^2}$) was compared. The results are shown in Tables 2-1 and 2-2.

⊚: AE was less than or equal to 1

○: AE was more than 1 and less than or equal to 2

Δ: AE was more than 2 and less than or equal to 3 x: AE was more than 3

[Conductivity]

Test pieces were cut into 300 mm×200 mm. After a position correction was performed using ten coordinates described below by using a four-terminal four-probe surface resistance measuring apparatus ("Roresta AP" available from Mitsubishi Chemical Corporation), the average values of surface resistances were determined. The results are shown in Tables 2-1 and 2-2.

(50, 30) (50, 90) (50, 150) (50, 210) (50, 270) (150, 30) (150, 90) (150, 150) (150, 210) (150, 270)

⊚: less than 0.1 mΩ

○: 0.1 mΩ or more and less than 0.5 mΩ

Δ: 0.5 mΩ or more and less than 1.0 mΩ x: more than 1.0 mΩ

TABLE 1-1

| | | METAL-SURFACE-TREATINT COMPOSITION | | | | | | | |
|---|---|---|---|---|---|---|---|---|---|
| | No. | Metal Sheet | Resin | Metal Ion | Acid | Water-Dispersible Resin | Coupling Agent | Organic Acid | Resin/Metal Ion/Acid/Water-Dispersible Resin/Coupling Agent/Organic Acid/Balance Weight Ratio (%) |
| Ex. | 1 | A | A | A | A | — | — | — | 10/5/15/—/—/—/70 |
| | 2 | B | A | A | A | — | — | — | 10/5/15/—/—/—/70 |
| | 3 | C | A | A | A | — | — | — | 15/0.5/20/—/—/—/64.5 |
| | 4 | D | A | A | A | — | — | — | 15/0.5/20/—/—/—/64.5 |
| | 5 | E | A | A | A | — | — | — | 3/10/5/—/—/—/82 |
| | 6 | F | A | A | A | — | — | — | 3/10/5/—/—/—/82 |
| | 7 | A | B | A | A | — | — | — | 10/5/15/—/—/—/70 |
| | 8 | A | C | A | A | — | — | — | 10/5/15/—/—/—/70 |
| | 9 | A | D | A | A | — | — | — | 10/5/15/—/—/—/70 |
| | 10 | A | E | A | A | — | — | — | 10/5/15/—/—/—/70 |
| | 11 | A | A | A | B | — | — | — | 10/5/15/—/—/—/70 |
| | 12 | A | A | A | C | — | — | — | 10/5/15/—/—/—/70 |
| | 13 | A | A | A | D | — | — | — | 10/5/15/—/—/—/70 |
| | 14 | A | A | A | A | A | — | — | 10/5/15/1/—/—/69 |
| | 15 | A | A | A | A | B | — | — | 10/5/15/5/—/—/65 |
| | 16 | A | A | A | A | A | A | — | 10/5/15/1/1/—/68 |
| | 17 | A | A | A | A | — | B | — | 10/5/15/—/5/—/65 |
| | 18 | A | A | A | A | — | C | — | 10/5/15/—/1/—/69 |
| | 19 | A | A | A | A | — | — | A | 10/5/15/—/—/5/65 |
| | 20 | A | A | A | A | — | — | B | 10/5/15/—/—/10/60 |

TABLE 1-2

| | | METAL-SURFACE-TREAATING COMPOSITION | | | | | | | |
|---|---|---|---|---|---|---|---|---|---|
| | No. | Metal Sheet | Resin | Metal Ion | Acid | Water-Dispersible Resin | Coupling Agent | Organic Acid | Resin/Metal Ion/Acid/Water-Dispersible Resin/Coupling Agent/Organic Acid/Balance Weight Ratio (%) |
| Ex. | 21 | A | A | A | A | A | — | A | 10/5/15/5/—/1/64 |
| | 22 | A | A | A | A | A | — | A | 10/5/15/5/—/1/64 |
| | 23 | A | A | A | A | A | — | A | 10/5/15/5/—/1/64 |
| | 24 | A | A | B | A | — | — | — | 10/5/15/—/—/—/70 |
| | 25 | A | A | D | A | — | — | — | 10/5/15/—/—/—/70 |
| | 26 | A | E | B | A | — | — | — | 10/5/10/—/—/—/75 |
| | 27 | A | A | A | A | — | — | C | 10/5/15/—/—/5/65 |
| | 26 | A | A | C | A | — | — | — | 10/5/15/—/—/—/70 |
| | 29 | G | A | A | A | — | — | — | 10/5/15/—/—/—/70 |
| | 30 | H | A | A | A | — | — | — | 10/5/15/—/—/—/70 |
| | 31 | I | A | A | A | — | — | — | 10/5/15/—/—/—/70 |
| | 32 | A | F | A | A | — | — | — | 10/5/15/—/—/—/70 |
| | 33 | A | G | A | A | — | — | — | 10/5/15/—/—/—/70 |
| | 34 | A | A | L | A | — | — | — | 10/5/15/—/—/—/70 |

TABLE 1-2-continued

| | | METAL-SURFACE-TREAATING COMPOSITION | | | | | | | |
|---|---|---|---|---|---|---|---|---|---|
| | No. | Metal Sheet | Resin | Metal Ion | Acid | Water-Dispersible Resin | Coupling Agent | Organic Acid | Resin/Metal Ion/Acid/Water-Dispersible Resin/ Coupling Agent/Organic Acid/Balance Weight Ratio (%) |
| | 35 | A | A | M | A | — | — | — | 10/5/15/—/—/—/70 |
| | 36 | A | A | N | A | — | — | — | 10/5/15/—/—/—/70 |
| | 37 | A | A | O | A | — | — | — | 10/5/15/—/—/—/70 |
| Comp. | 1 | A | A | E | A | — | — | — | 10/5/10/—/—/—/75 |
| Ex. | 2 | A | D | E | A | — | A | — | 10/3/10/—/2/—/75 |
| | 3 | A | A | F | A | — | — | — | 10/5/10/—/—/—/75 |
| | 4 | A | — | G | D | — | — | — | —/5/1/—/—/—/94 |
| | 5 | A | H | H | A | — | — | — | 15/0.1/15/—/—/—/70 |
| | 6 | B | I | I | A | — | — | — | 20/0.1/5/—/—/—/75 |
| | 7 | A | J | J | D | — | C | — | 10/0.1/5/—/10/—/75 |
| | 8 | C | K | — | — | — | — | — | 10/—/—/—/—/—/90 |
| | 9 | A | L | K | A | — | — | — | 10/5/10/—/—/—/75 |

TABLE 2-1

| | No. | Film Thickness (μm) | Corrosion Resistance | Conductivity | Adhesiveness After Coating | Fingerprint Resistance |
|---|---|---|---|---|---|---|
| Ex. | 1 | 0.4 | ○ | ⊙ | ○ | ○ |
| | 2 | 0.4 | ○ | ⊙ | ○ | ○ |
| | 3 | 0.4 | ○ | ⊙ | ○ | ○ |
| | 4 | 0.4 | ○ | ⊙ | ○ | ○ |
| | 5 | 0.4 | ○ | ⊙ | ○ | ○ |
| | 6 | 0.4 | ○ | ⊙ | ○ | ○ |
| | 7 | 0.3 | ○ | ⊙ | ○ | ○ |
| | 8 | 0.4 | ○ | ⊙ | ○ | ○ |
| | 9 | 0.5 | ○ | ⊙ | ○ | ○ |
| | 10 | 0.4 | ○ | ⊙ | ○ | ○ |
| | 11 | 0.4 | ○ | ⊙ | ○ | ○ |
| | 12 | 0.4 | ○ | ⊙ | ○ | ○ |
| | 13 | 0.4 | ○ | ⊙ | ○ | ○ |
| | 14 | 0.4 | ○ | ⊙ | ⊙ | ⊙ |
| | 15 | 0.4 | ○ | ⊙ | ⊙ | ⊙ |
| | 16 | 0.4 | ○ | ⊙ | ⊙ | ⊙ |
| | 17 | 0.4 | ⊙ | ⊙ | ⊙ | ⊙ |
| | 18 | 0.3 | ○ | ⊙ | ⊙ | ⊙ |
| | 19 | 0.4 | ⊙ | ⊙ | ⊙ | ⊙ |
| | 20 | 0.4 | ⊙ | ⊙ | ⊙ | ⊙ |
| | 21 | 0.4 | ○ | ⊙ | ⊙ | ⊙ |
| | 22 | 0.1 | ○ | ⊙ | ⊙ | ⊙ |
| | 23 | 2 | ⊙ | ○ | ⊙ | ⊙ |
| | 24 | 0.4 | ⊙ | ⊙ | ○ | ○ |
| | 25 | 0.4 | ⊙ | ⊙ | ○ | ○ |
| | 26 | 0.4 | ○ | ○ | ○ | ○ |
| | 27 | 0.4 | ⊙ | ⊙ | ⊙ | ⊙ |
| | 28 | 0.4 | ⊙ | ⊙ | ⊙ | ⊙ |
| | 29 | 0.4 | ○ | ⊙ | ○ | ○ |
| | 30 | 0.4 | ○ | ⊙ | ○ | ○ |
| | 31 | 0.4 | ○ | ⊙ | ○ | ○ |
| | 32 | 0.4 | ○ | ⊙ | ○ | ○ |
| | 33 | 0.4 | ○ | ⊙ | ○ | ○ |
| | 34 | 0.4 | ○ | ⊙ | ○ | ○ |
| | 35 | 0.4 | ○ | ⊙ | ○ | ○ |
| | 36 | 0.4 | ○ | ⊙ | ○ | ○ |
| | 37 | 0.4 | ○ | ⊙ | ○ | ○ |

TABLE 2-2

| | No. | Film Thickness (μm) | Corrosion Resistance | Conductivity | Adhesiveness After Coating | Fingerprint Resistance |
|---|---|---|---|---|---|---|
| Comp. | 1 | 0.8 | x | ○ | ○ | ○ |
| Ex. | 2 | 2 | ⊙ | x | ⊙ | ⊙ |

TABLE 2-2-continued

| No. | Film Thickness (μm) | Corrosion Resistance | Conductivity | Adhesiveness After Coating | Fingerprint Resistance |
|---|---|---|---|---|---|
| 3 | 0.4 | x | ⊙ | ○ | ○ |
| 4 | 0.2 | x | ⊙ | ⊙ | x |
| 5 | 0.4 | ⊙ | x | ⊙ | Δ |
| 6 | 1.0 | ⊙ | x | ⊙ | Δ |
| 7 | 0.3 | ⊙ | x | ⊙ | ○ |
| 8 | 1.0 | x | x | ⊙ | Δ |
| 9 | 1.5 | ⊙ | x | ⊙ | ○ |

Industrial Applicability

A metal-surface-treating composition of the present invention is chromium-free, therefore a pollution-free non-chromate treating agent. When the invention is applied to metal materials, typically zinc-type-plated steel sheets, surface-treated metal materials exhibiting both superior conductivity and corrosion resistance can be obtained. These materials can be used in place of the chromate-treated steel sheets used in conventional automobiles, home appliances, and building materials. Moreover, because the surface-treated steel sheets are chromium-free and pollution-free, the use thereof is extensive, including packaging, table wares, and interior home materials.

What is claimed is:

1. A metal-surface-treating composition comprising:

metal ions of Al, Mg and Mn;

a water-soluble organic resin comprising a polymer or a copolymer derived from at least one monomer containing not less than 40% of a carboxylic monomer;

an acid; and water.

2. The metal-surface-treating composition according to claim 1, wherein the acid comprises at least one selected from the aroup consisting of phosphoric acid, acetic acid, nitric acid and hydrofluoric acid.

3. The metal-surface-treating composition according to claim 1, further comprising at least one ion selected from the group consisting of Zn, Co, Ti, Sn, Ni, Fe, Zr, Sr, Y, Nb, Cu, Ca, V and Ba.

4. The metal-surface-treating composition according to claim 1, further comprising polyphenol carboxylic acids.

5. A surface-treated metal material comprising a film of the metal-surface-treating composition of claim 1 on a metal material.

6. The surface-treated metal material according to claim 5, wherein the metal material comprises a zinc-based plated sheet.

7. A metal-surface-treating composition comprising:

metal ions of Al, Mg and Mn;

a water-soluble organic resin;

an acid;

a coupling agent; and water.

* * * * *